(12) United States Patent
Reynolds et al.

(10) Patent No.: US 7,771,584 B2
(45) Date of Patent: Aug. 10, 2010

(54) INTEGRATED UNSUPPORTED SLURRY CATALYST PRECONDITIONING PROCESS

(75) Inventors: Bruce E. Reynolds, Martinez, CA (US); Axel Brait, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 174 days.

(21) Appl. No.: 11/567,652

(22) Filed: Dec. 6, 2006

(65) Prior Publication Data

US 2008/0135450 A1    Jun. 12, 2008

(51) Int. Cl.
*C10G 47/02*    (2006.01)
(52) U.S. Cl. .................. 208/108; 208/213; 208/215; 208/251 H; 208/254 H; 210/804; 502/152; 502/220
(58) Field of Classification Search .............. 208/108, 208/213, 215, 251 H, 254 H; 210/804; 502/152, 502/220
See application file for complete search history.

(56) References Cited

U.S. PATENT DOCUMENTS

| | | | | |
|---|---|---|---|---|
| 3,567,433 | A | * | 3/1971 | Gutnikov ................ 423/53 |
| 4,661,265 | A | * | 4/1987 | Olson et al. ............. 210/804 |
| 4,710,486 | A | | 12/1987 | Lopez |
| 4,721,606 | A | | 1/1988 | Tilley |
| 4,824,821 | A | * | 4/1989 | Lopez et al. ............ 502/220 |
| 4,970,190 | A | | 11/1990 | Lopez |
| 5,288,681 | A | * | 2/1994 | Gatsis ................. 502/152 |
| 2004/0256286 | A1 | | 12/2004 | Miller et al. |
| 2005/0006283 | A1 | | 1/2005 | Leung et al. |
| 2006/0054533 | A1 | | 3/2006 | Chen |
| 2006/0054534 | A1 | | 3/2006 | Chen |
| 2006/0054535 | A1 | | 3/2006 | Chen |
| 2006/0058174 | A1 | | 3/2006 | Chen |
| 2006/0058175 | A1 | | 3/2006 | Chen |

* cited by examiner

*Primary Examiner*—Glenn Caldarola
*Assistant Examiner*—Prem C. Singh

(57) ABSTRACT

A process for slurry hydroprocessing, which involves preconditioning a slurry catalyst for activity improvement in vacuum residuum hydroprocessing units Preconditioning the slurry catalyst raises its temperature, thereby reducing shock on the catalyst slurry as it enters the hydroprocessing reactor.

20 Claims, 1 Drawing Sheet

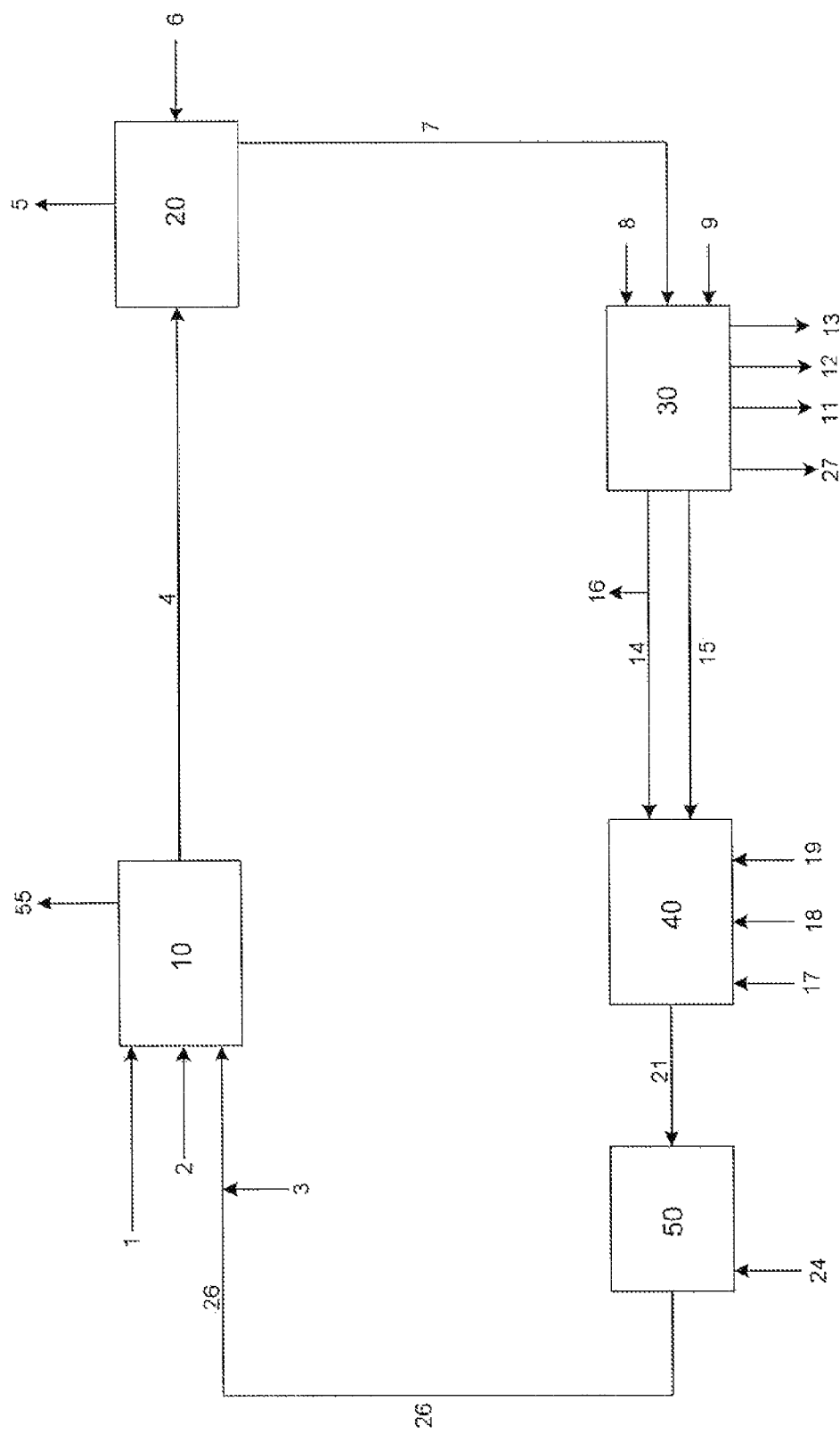
FIGURE

INTEGRATED UNSUPPORTED SLURRY CATALYST PRECONDITIONING PROCESS

FIELD OF THE INVENTION

A process for slurry hydroprocessing, which involves preconditioning a slurry catalyst for activity improvement in vacuum residuum hydroprocessing units.

BACKGROUND OF THE INVENTION

Slurry catalyst compositions, means for their preparation and their use in hydroprocessing of heavy feeds are known in the refining arts. Some examples are discussed below:

U.S. Pat. No. 4,710,486 discloses a process for the preparation of a dispersed Group VIB metal sulfide hydrocarbon oil hydroprocessing catalyst. Process steps include reacting aqueous ammonia and a Group VIB metal compound, such as molybdenum oxide or tungsten oxide, to form a water soluble oxygen-containing compound such as ammonium molybdate or tungstate.

U.S. Pat. No. 4,970,190 discloses a process for the preparation of a dispersed Group VIB metal sulfide catalyst for use in hydrocarbon oil hydroprocessing. This catalyst is promoted with a Group VIII Metal. Process steps include dissolving a Group VIB metal compound, such as molybdenum oxide or tungsten oxide, with ammonia to form a water soluble compound such as aqueous ammonium molybdate or ammonium tungstate.

Slurry hydroprocessing processes frequently operate at higher temperatures than those at which slurries comprising catalysts are synthesized and stored. For example, the slurry hydrocracking process of U.S. Publication No. 20060054533 typically operates at a temperature of at least 800° F., with a hydrogen pressure from about 1500 psi to about 3500 psi. The slurry catalysts generally enter the reactor (or initial reactor, if more than one) of the vacuum residuum hydroprocessing unit at a temperature around 450° F. and a hydrogen pressure of about 400 psi. This temperature and pressure differential shocks the highly active slurry catalyst and promotes the production of coke. Coke production decreases the efficiency of conversion by this catalyst.

SUMMARY OF THE INVENTION

This application discloses a process for slurry hydroprocessing, particularly slurry hydrocracking, in which the slurry catalyst is preconditioned prior to its entry into the reactor(s) of the vacuum residuum slurry hydroprocessing process. Preconditioning the slurry catalyst raises its temperature, thereby reducing shock on the catalyst slurry as it enters the hydroprocessing reactor.

The process of this invention is summarized as follows:

A process for the hydroprocessing of heavy oils, having at least one reaction stage, said process comprising the following steps:

(a) contacting a hydrocarbon feed stream under slurry hydroprocessing conditions with a hydrogen stream and a stream comprising slurry hydroprocessing catalyst, in a vacuum residuum slurry hydroprocessing unit, and recovering a product stream along with a stream comprising spent slurry hydroprocessing catalyst and unconverted hydrocarbon feed;

(b) passing the stream comprising spent slurry hydroprocessing catalyst and unconverted hydrocarbon feed to a deoiling unit, where it is combined with a solvent, products and gases then being recovered, as well as a stream comprising spent slurry catalyst;

(c) passing the: stream comprising spent slurry catalyst to a metals recovery unit, where it is contacted with an ammonium leach solution in order to recover ammonium sulfate and compounds comprising Group VIII and Group VIB metals (d) passing the compounds comprising Group VIII and Group VIB metals to a catalyst synthesis unit, where they are contacted with ammonia, hydrogen sulfide gas, hydrocarbon stream, hydrogen and a small amount of water to create an active slurry catalyst in oil, the oil comprising ammonium sulfate;

(e) passing the effluent of step (d) into a preconditioning unit in order to increase the temperature and reduce shock on the slurry catalyst, wherein the effluent is contacted with hydrogen and is decomposed into hydrogen sulfide and ammonia, streams which are removed from: the preconditioning unit;

(f) passing the effluent for step (e), which comprises the active slurry catalyst in oil to storage or to a vacuum residuum slurry hydroprocessing unit.

BRIEF DESCRIPTION OF THE FIGURE

The FIGURE illustrates the process disclosed in this invention for vacuum residuum slurry hydroprocessing using preconditioned slurry catalyst.

DETAILED DESCRIPTION OF THE INVENTION

Stream 1, which comprises hydrogen, enters the vacuum residuum slurry hydroprocessing unit (VRHU) 10. Hydroprocessing processes which may be employed in this invention include hydrocracking, hydrotreating hydrodesulfurization, hydrodenitrification, and hydrodemetallization. Hydrocracking is the preferred process, however. Also entering VRHU 10 is a feed stream 2 (vacuum residuum is a common feed), hydrogen stream 3 and slurry catalyst stream 26 (which maybe admixed with Stream 3 comprising water). The slurry hydrocracking process typically operates at a temperature of at least 800° F., with a hydrogen pressure from about 1500 psi to about 3500 psi. The slurry catalysts following preconditioning, generally enters the reactor (or initial reactor, if more than one) of the vacuum residuum hydroprocessing unit at a temperature around 700° F. and a hydrogen pressure of about 2000 psi, Products exit VRHU 10 through stream 55. Stream 4, the spent slurry catalyst stream comprising unconverted oil, enters a deoiling unit 20 where it is contacted by a solvent (stream 6) such as toluene or naphtha in order to remove products and gases (stream 5). Deoiling involves solid concentration and liquid removal, which may employ cross flow filtration, centrifugation, drying and quenching steps.

Stream 7 comprises deoiled spent slurry catalyst. Stream 7 enters the metals recovery unit (MRU 30). Enriched air enters the MRU 30 through stream 8. Stream 9 is a solvent suitable for metals extraction, such as ketoxime. Through a series of solvent extractions and crystallization steps in MRU 30, the metals from the oil stream are recovered, along with a byproduct of ammonium sulfate (stream 27). Vanadium is removed through stream 11 as $V_2O_5$. Spent metals extraction solvent is removed through stream 12 and wastewater is removed through stream 13.

The Group VIII metal employed in the CASH process is often nickel. Nickel is recovered as a nickel sulfate stream (stream 14) and is passed to the catalyst synthesis unit (GSU

40). A portion of the nickel sulfate stream (stream 16) can be diverted to control the amount of nickel entering the catalyst synthesis unit (CSU 40). Recovered Group VI metals such as molybdenum, exit the MRU in stream 15. If the metal is molybdenum, it is recovered as an ammonium dimolybdate stream (stream 15) which is passed to the catalyst synthesis unit (CSU 40). A light hydrocarbon or VGO (vacuum gas oil) (stream 17) enters into the catalyst synthesis unit (CSU 40) along with a small amount of water (stream 18). Stream 19 comprises hydrogen.

In the catalyst synthesis unit (CSU 40), conditions include a temperature in the range from 80° F. to 200° F., preferably in the range from 100° F. to 180° F., and most preferably in the range from 130° F. to 160° F. Pressure is in the range from 100 to 3000 psig, preferably in the range from 200 to 1000 psig, and most preferably from 300 to 500 psig.

The ingredients are mixed in the CSU 40 to form an active slurry catalyst in oil. A small amount of ammonium sulfate formed from the nickel sulfate and ammonia gas added to the CSU 40, is also present in this stream. The small stream of water (stream 18) acts to keep the small amount of ammonium sulfate in solution. This prevents precipitation in the equipments. The active slurry catalyst in oil (stream 21) enters into a catalyst preconditioning unit (CPU 50). Hydrogen enters the CPU 50 through stream 24.

The process conditions of the catalyst preconditioning unit (CPU 50) include temperature ranges from about 400° F. to about 1000° F., preferably from about 500° to about 800° F., and most preferably from about 600° F. to about 700° F. Pressure ranges from about 100 to about 3000 psi, preferably from 300 to about 2500 psi and more preferably from about 500 to about 2000 psi. The hydrogen rate is in the range from 2500 to 7500 scf/bbl, preferably from 500 to 6000 scf/bbl. Preconditioning of ammonium sulfate into hydrogen sulfide and ammonia requires about 2 hours. Residence time in the catalyst preconditioning unit (CPU) for the mixture comprising oil, slurry and ammonium sulfate is from 1.5 to three hours, preferably about 2 hours.

For every mole of hydrogen sulfide gas produced in the catalyst preconditioning unit (CPU 50) unit, 2 moles of ammonia are produced.

The CPU 50 is a continuously stirred tank reactor (CSTR or alternately, perfectly mixed reactor). This type of reactor is employed in order to prevent catalyst agglomeration.

The residuum feedstock 2 to the process of the present invention is generally a high boiling hydrocarbonaceous material having a normal boiling range mostly above 600° F. often having a normal boiling point range wherein at least 80% v/v of the feed boils between 600° F. and 1500° F., or between 800° F. and 1450° F. Residuum feedstocks usefully processed in the present invention may contain more than 500 ppm asphaltenes or 1000 ppm asphaltenes, and may contain as much as 10,000 ppm asphaltenes or more. The residuum feedstocks also usually contain more than 10 ppm metals and greater than 0.1% by weight sulfur. The metals are betieved to be present as organometallic compounds, but the concentrations of metals referred to herein are calculated as parts per million pure metal. The contaminating metals in the feed typically include nickel, vanadium and iron The sulfur is present as organic sulfur compounds and the wt % sulfur is calculated based on elemental sulfur. Typical feedstocks for the present invention include deasphalted residua or crude, crude oil atmospheric distillation column bottoms (reduced crude oil or atmospheric column residuum), or vacuum distillation column bottoms (vacuum residua).

EXAMPLE

Typical vacuum residuum feed properties are listed in the following table:

| | |
|---|---|
| API gravity at 60/60 | 3.9 |
| Sulfur (wt %) | 5.58 |
| Nitrogen (ppm) | 5770 |
| Nickel (ppm) | 93 |
| Vanadium (ppm) | 243 |
| Carbon (wt %) | 83.57 |
| Hydrogen (wt %) | 10.04 |
| MCRT (wt %) | 17.2 |
| Viscosity @ 212° F. (cSt) | 3727 |
| Pentane Asphaltenes (wt %) | 13.9 |
| Fraction Boiling above 1050° F. (wt %) | 81 |

Typical process conditions used for heavy oil upgrading are listed as following:

| | |
|---|---|
| Total pressure (psig) | 2500 |
| Mo/Oil ratio (%) | 1.5 |
| LHSV | 0.25 |
| Reactor temperature (° F.) | 700-725° F. |
| H2 gas rate (SCF/B) | 7500 |

Two batches of slurry catalyst streams obtained as described above were sent to the vacuum residuum hydrocracking (VRHU) unit for use as catalysts The first batch was sent to the VRHU directly from the catalyst synthesis unit or from storage, without preliminary preconditioning.

The second batch was preconditioned in hydrogen as shown in the FIGURE prior to entering the VRHU.

Side by side comparison of VRHU performance results for conditioned slurry catalyst v. unconditioned slurry catalyst, are provided in the table below:

| | Without Preconditioning | With Preconditioning |
|---|---|---|
| Hydrodenitrogenation: | 80.5% | 89.4% |
| Hydrodemetallization | 97.2 | 98.6 |
| Conversion of 1000 F. + fraction | 96.5 | 99.1 |
| Conversion of 650 F. + Fraction | 69.8 | 74.1 |
| Conversion of 800 F. + Fraction | 88.3 | 91.8 |

The improvement is approximately equivalent to increasing the fresh catalyst dosage to the VRHU by 30%.

What is claimed is:

1. A process for the hydroprocessing of heavy oil feedstocks having at least one hydroprocessing reaction stage and employing an active slurry catalyst in oil, wherein the slurry catalyst is preconditioned in a preconditioning unit with hydrogen prior to introducing the catalyst into the hydroprocessing reaction stage to be in contact with heavy oil feedstocks, wherein the slurry catalyst comprises Group VIII and Group VI metal compounds, the slurry catalyst in oil were previously sulfided to create the active catalyst in a light hydrocarbon oil or a vacuum gas oil.

2. The process of claim 1, wherein conditions in the preconditioning unit comprise a temperature in the range from 400° F. to 1000° F.

3. The process of claim 2, wherein the conditions in the preconditioning unit comprise a temperature in the range from 500° to 800° F.

4. The process of claim 3, wherein the conditions in the preconditioning unit comprise a temperature in the range from 600° F. to 700° F.

5. The process of claim 1, wherein conditions in the preconditioning unit comprise a pressure in the range from 100 to 3000 psi.

6. The process of claim 5, wherein conditions in the preconditioning unit comprise a pressure in the range from 300 to 2500 psi.

7. The process of claim 6, wherein conditions in the preconditioning unit comprise a pressure in the range from 500 to 2000 psi.

8. The process of claim 1, wherein the preconditioning unit has a hydrogen flow rate in the preconditioning unit is in the range from 2500 to 7500 scf/bbl.

9. The process of claim 8, wherein the hydrogen flow rate is in the range from 5000 to 6000 scf/bbl.

10. The process of claim 1, wherein the slurry catalyst has a residence time in the preconditioning unit from 1.5 to 3 hours.

11. The process of claim 1, wherein the slurry catalyst is synthesized from Group VIII and Group VI metal compounds, ammonia, hydrogen sulfide, hydrogen, a small amount of water, and a light hydrocarbon or vacuum gas oil, forming a slurry catalyst in oil.

12. A process for the hydroprocessing of heavy oil feedstock having at least one reaction stage and employing an active slurry catalyst in oil, the process comprising:
  passing compounds comprising Group VIII and Group VIB metals to a catalyst synthesis unit, where they are contacted with ammonia, hydrogen sulfide gas, a hydrocarbon stream which is a light hydrocarbon oil or a vacuum gas oil, hydrogen and a small amount of water to sulfide the catalyst forming an active slurry catalyst in oil, the oil comprising ammonium sulfate;
  passing the active slurry catalyst in oil to a preconditioning unit wherein the slurry catalyst is preconditioned by being into contact with hydrogen at a rate from 2500 to 7500 scf/bbl;
  contacting the heavy oil feedstock with a hydrogen stream and the preconditioned slurry catalyst slurry in hydroprocessing unit under hydroprocessing conditions; and
  recovering from the hydroprocessing unit a product stream, along with a stream comprising spent slurry hydroprocessing catalyst and unconverted hydrocarbon feed.

13. The process of claim 12, further comprising:
  passing the stream comprising spent slurry hydroprocessing catalyst and unconverted hydrocarbon feed to a deoiling unit, where it is combined with a solvent, products and gases then being recovered, as well as a stream comprising spent slurry catalyst.

14. The process of claim 13, further comprising:
  passing the stream comprising spent slurry catalyst to a metals recovery unit, where it is contacted with an ammonium leach solution, generating ammonium sulfate and compounds comprising Group VIII and Group VIB metals.

15. The process of claim 14, wherein the Group VIII metal is nickel and the Group VIB metal is molybdenum.

16. The process of claim 12, wherein the slurry catalyst is preconditioned at a temperature in the range from 400° F. to 1000° F.

17. The process of claim 16, wherein the slurry catalyst is preconditioned under a pressure in the range from 100 to 3000 psi.

18. The process of claim 17, wherein the slurry catalyst is preconditioned under a pressure in the range from 300 to 2500 psi.

19. The process of claim 12, wherein the slurry catalyst is preconditioned for a residence time ranging from 1.5 to 3 hours.

20. The process of claim 12, wherein the hydroprocessing conditions are selected from the group consisting of hydrocracking, hydrotreating, hydrodesulfurization, hydrodenitrification, and hydrodemetallization.

* * * * *